United States Patent [19]

Kurokawa et al.

[11] Patent Number: 5,446,782
[45] Date of Patent: Aug. 29, 1995

[54] TERMINAL CONNECTING DEVICE HAVING AN AUTO DATA RECEIVING FUNCTION

[75] Inventors: Osamu Kurokawa; Hiroki Yoshida; Tsutomu Inaba, all of Tokyo, Japan

[73] Assignee: Kabushiki Kaisha Toshiba, Japan

[21] Appl. No.: 913,382

[22] Filed: Jul. 15, 1992

[30] Foreign Application Priority Data

Jul. 16, 1991 [JP] Japan .................................. 3-175549
Oct. 4, 1991 [JP] Japan .................................. 3-257764

[51] Int. Cl.⁶ .......................................... H04M 11/00
[52] U.S. Cl. ........................................ 379/58; 379/61
[58] Field of Search ................. 379/58, 59, 63, 100, 379/93, 94, 61; 358/400, 442; 455/89

[56] References Cited

U.S. PATENT DOCUMENTS

| | | | |
|---|---|---|---|
| 4,881,129 | 11/1989 | Mitsuhashi | 379/100 |
| 4,977,609 | 12/1990 | McClure | 455/89 |
| 4,991,201 | 2/1991 | Tseng | 379/58 |
| 5,109,541 | 4/1992 | Park | 455/89 |
| 5,200,991 | 4/1993 | Motoyanagi | 379/100 |
| 5,282,238 | 1/1994 | Berland | 379/58 |

*Primary Examiner*—Curtis Kuntz
*Assistant Examiner*—Michael B. Chernoff
*Attorney, Agent, or Firm*—Banner & Allegretti, Ltd.

[57] ABSTRACT

A terminal connecting device having an automatic data reception feature provides an interface between a radiotelephone and a data terminal device such as a facsimile machine without the need for modifying the specifications of the radiotelephone. By selecting an automatic data reception mode, a telephone subscriber may cause an incoming facsimile call to be engaged by the data terminal device without further subscriber intervention. The radiotelephone is connected to a communication network via a radio line and has connections for voice, call signaling information, and power. The radiotelephone includes switching means for selectively switching between a voice path and a data path, the latter being provided to the terminal connecting device. The terminal connecting device includes means, responsive to a calling signal from the radiotelephone, for controlling the data terminal device by converting the calling signal into a receive signal for the data terminal device and transferring the receive signal to the data terminal device. When the data terminal device responds after having changed to a data reception mode, a signal is generated to the terminal connecting device, which is subsequently transferred to the radiotelephone to selectively switch the data path to the data terminal device. A power booster is also disclosed which boosts a voltage supplied from the radiotelephone to power the data terminal device through the terminal connecting device.

11 Claims, 3 Drawing Sheets

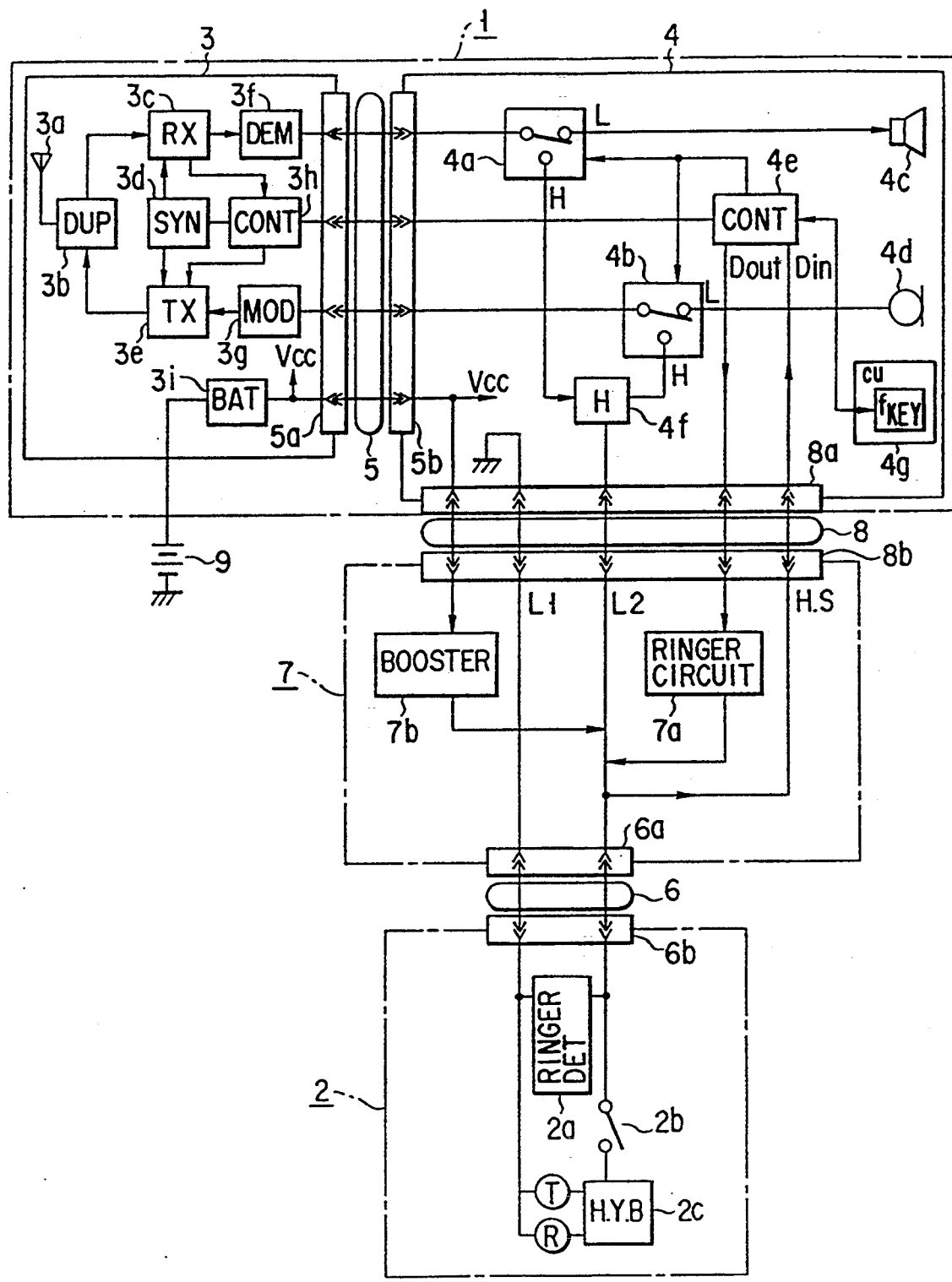
F I G. 1

TERMINAL CONNECTING DEVICE HAVING AN AUTO DATA RECEIVING FUNCTION

BACKGROUND OF THE INVENTION

1. Field of the Invention

The present invention relates to a terminal connecting device which is connected to a radiotelephone unit system such as a mobile radiotelephone to make it possible to perform a data transfer.

2. Description of the Related Art

In recent years, there has been a proliferation of mobile radio communication systems such as portable and mobile radiotelephone systems.

In these systems, a data terminal such as a facsimile machine is connected to, for example, a mobile radiotelephone to be used as a mobile station device, thereby providing a data communication function in addition to a normal telephone communication function. Such a mobile radiotelephone system to which the data terminal is connected comprises a radio device, a telephone device, and a radio-telephone interface cable connecting the radio device to the telephone device.

In general, in the case where data is transferred to a data terminal connected to the mobile radiotelephone system from another subscriber's data terminal which is connected to a wire telephone network, the following data transfer procedure will be carried out.

Firstly, a subscriber desiring data transfer initiates "a call" to connect the mobile radio-telephone system to the wire telephone network. Then, a call-accepted signal is transmitted to the mobile radiotelephone system from the wire telephone network via the nearest radio station. As a result, in the mobile radiotelephone system, an alert signal is generated and the subscriber on the receiving side is informed.

If the subscriber on the receiving side carries out an "off-hook" by operation a predetermined key operation and responds to the off-hook, a response signal is sent from the mobile radiotelephone system to the wire telephone network via a radio line and a radio station. As a result, the data terminal on the transmitting side and the data terminal on the receiving side are connected to each other via a communication line by the wire telephone network. Under this condition, if the data terminal on the transmission side transmits a predetermined signal for data transfer to be performed, the signal is transferred to the mobile radiotelephone system on the receiving side and voice-outputted via the communication line. The subscriber, who has listened to the voice-output and confirmed the output, sets the terminal to be in a data transfer made by a predetermined key input operation of the mobile radio-telephone system. Thereafter, the operator pushes a predetermined receiving start key of the data terminal, and starts a receiving operation. Under this state, a response signal is transmitted from the data terminal on the transmission side from the data terminal on the receiving side to the data terminal on the transmission side. Thereafter, the data terminal on the transmission side starts the predetermined data transmission. In other words, in the conventional system, in order for the subscriber to receive data, the subscriber must push (i.e. input) a predetermined key, which is placed on a console unit provided in each of the mobile radiotelephone systems and the data terminal, a plurality of times by a manual operation.

In the conventional system, in order to reduce the above complicated manual operations, there has been considered an adapter having a dedicated circuit for performing an automatic receiving such as a tone ringer circuit inside. However, a complicated connection method and a connection cable or an interface must be made in accordance with the addition of such an adapter.

As mentioned above, every time the subscriber of the mobile radiotelephone system carries out data reception and transmission, the subscriber must set the mobile radiotelephone system and the data terminal to be in an operation mode, which can perform the data communication, by manual operation at least twice or more. Thus operation of the units is very complicated in performing the data communication. Particularly, if the subscriber is not in a car at the time of the data receiving, it is impossible to respond to the calling signal and data reception cannot be carried out. Moreover, in a case where the subscriber is driving the car, it is extremely difficult to perform the mode setting operation, and data reception cannot be carried out.

In order to connect an adapter having a dedicated circuit for performing an automatic receiving such as a tone ringer circuit inside, a power source dedicated to the adapter is needed in addition to the connection cord and the interface. As a result, there are problems locating mounting space for these additional devices and the wiring of the connection cord. On the other hand, incorporating the dedicated circuit for the automatic receiving in the mobile radiotelephone system enlarges the mobile radiotelephone system itself, and thus incur problems in the design of the mobile radiotelephone system and increase the manufacturing cost.

As mentioned above, there are many problems to be solved in the conventional system.

An object of the present invention is to provide a terminal connecting device, which is connected to a radiotelephone system without changing the basic specification of the radiotelephone unit such as a mobile radiotelephone system and its structure, and which can receive data by adding an automatic receiving function in which a subscriber does not have to carry out a mode setting operation in performing a data communication even if the subscriber is not in a car or is driving the car.

In order to attain the above object, the present invention provides the following two structures.

A terminal connecting device having a receiving transfer unit and a receiving response transfer unit is provided between a radiotelephone unit, which is connected to a communication network via a radio line and which has a predetermined receiving and transmitting control unit, and a data terminal device having a data receiving control unit for performing a data reception operation in accordance with a predetermined transfer procedure. Then, when a calling signal is supplied from the communication network to the radiotelephone unit, the incoming calling signal is detected by the receiving transfer unit of the terminal connecting device, and a receiving signal corresponding to the calling signal is generated. The receiving signal is transferred to the data terminal device and the data receiving control unit is started. Moreover, when a receiving response signal is generated by the data terminal after transferring the receiving signal by the receiving transfer unit, the receiving response signal is transferred to the radiotelephone unit by the receiving response transferring unit and thereby the receiving response signal is sent to the communication network by the receiving and transmitting control unit.

Moreover, a power supply unit using a power source of the radiotelephone unit is included in the terminal connecting device. Thereby, a power source output outputted from the radiotelephone unit is boosted, and a necessary predetermined power source voltage is generated in the data terminal device.

As a result of using the structure of the above-mentioned system, the following technical advantages can be obtained.

When the calling signal is sent from the telephone network via a radio line, the receiving signal is generated in accordance with the calling signal by the terminal connecting device, and transferred to the data terminal device. Due to this, in the data terminal device, a response control to the receiving signal is performed and a data receiving state is set. Moreover, when the predetermined receiving response signal is generated from the data terminal device, the receiving response signal is transferred to the radiotelephone unit via the terminal connecting device. Due to this, in the radiotelephone unit, the transfer line of the receiving data is switched and connected to the data terminal device and the communication line is established between the radiotelephone unit and the data terminal device on the receiving side. Therefore, the subscriber does not have to carry out the mode setting operations of the radiotelephone device and the data terminal device in receiving data. As a result, the data reception can be carried out even if the subscriber is not in a car or is driving the car.

Moreover, the power supply unit using the power source output outputted from the radiotelephone unit is provided in the terminal connecting device. Thereby, power for driving the data terminal device such as a facsimile machine mounted in the car can be easily ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit block diagram showing the structure of a mobile radiotelephone system using a terminal connecting device according to one embodiment of the present invention;

DETAILED DESCRIPTION OF THE PREFERRED EMBODIMENTS

Figure 2:
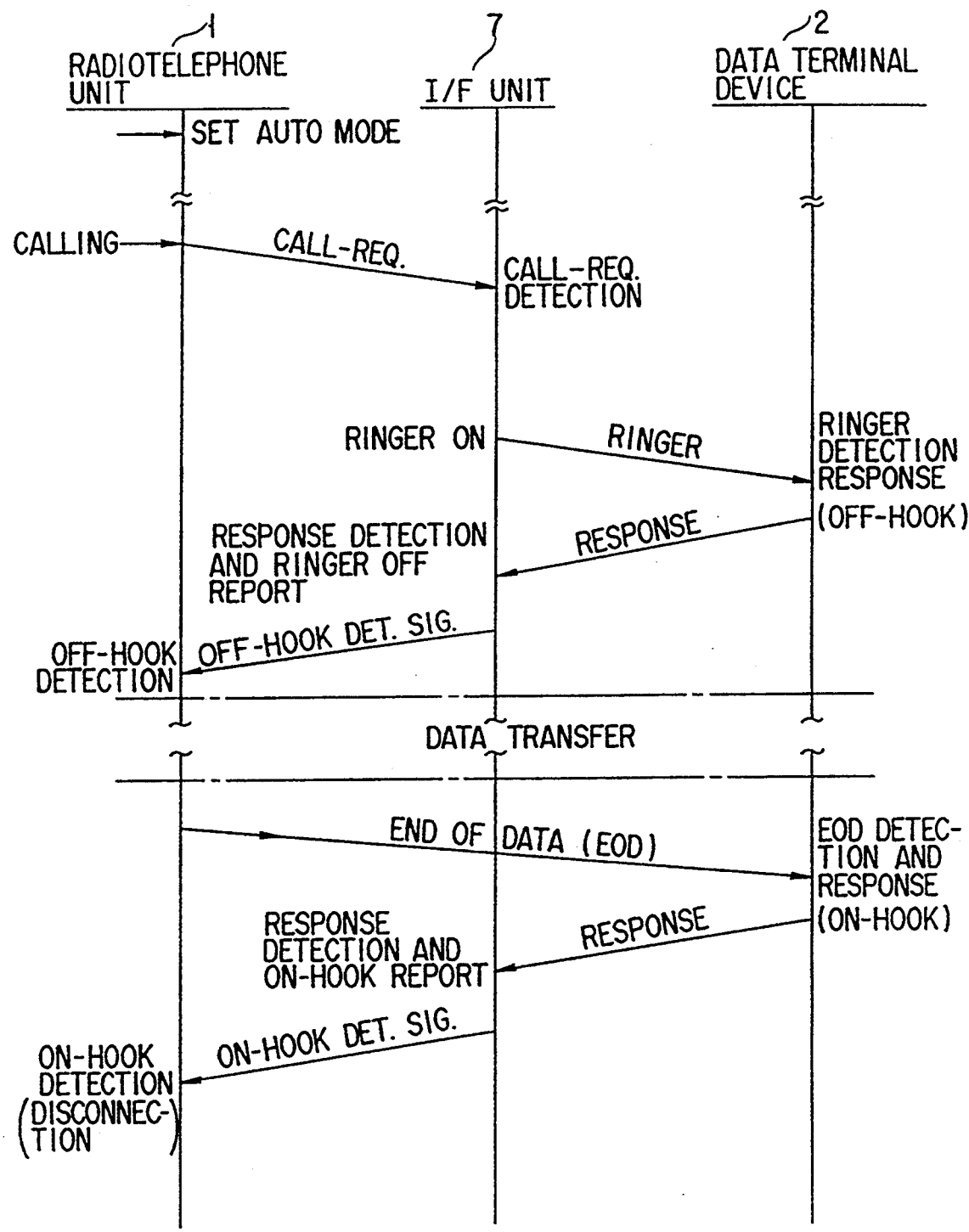
FIG. 2 is a calling sequence for explaining an operation procedure of the system of FIG. 1.

The circuit block diagram of FIG. 1 shows the structure of a terminal connecting device according to one embodiment of the present invention, and particularly shows the structure of a mobile radiotelephone system.

As shown in the drawing, the mobile radiotelephone system comprises a radiotelephone unit 1, a data terminal device 2, and a data terminal interface device serving as a terminal connecting device 7. The radiotelephone unit 1 further comprises a radio device 3 and a telephone device 4. The radio device 3 and the telephone device 4 are connected to each other via a radiotelephone interface cable 5. Moreover, a data terminal interface device 7 is connected to the telephone device 1 via an interface cable 8. On the other hand, the data terminal interface device 7 is connected to the data terminal device 2 via a data terminal interface cable 6.

The telephone device 3 comprises an antenna 3a, an antenna sharing unit (DUP) 3b, a receiving circuit (RX) 3c, a frequency synthesizer (SYN) 3d, a transmitting circuit (TX) 3e, an analog demodulating circuit (DEM) 3f, an analog modulating circuit (MOD) 3g, a first controlling circuit (CONT) 3h, and a power supply circuit (BAT) 3i. The telephone device 4 comprises selectors 4a, 4b, a telephone receiver 4c, a transmitter 4d, a second controlling circuit (CONT) 4e, a hybrid circuit 4f, and a console unit (CU) 4g. The first controlling circuit 3h converts the calling signal sent from the receiving circuit 3c to a serial signal, and supplies the signal to the second controlling circuit 4e in addition to the normal control such as the communication channel establishing control in accordance with the incoming call. Moreover, the first control circuit 3h has a function of supplying a response signal to be returned to the transmitting circuit 3e from the data terminal device 2 via the interface device 7 and the second controlling circuit 4e. The power supply circuit 3i is a power supply circuit generating a predetermined operating voltage based on the output of a car battery 9, and supplies the generated operation voltage to the telephone device 4, the interface device 7, and the data terminal device 2.

The console unit 4g is a unit comprising a switch unit such as a dial key group and a function key, and a display unit such as a light emitting diode and a liquid crystal display. The subscriber determines whether or not automatic data. Reception is to be performed in receiving data, and inputs mode information designating that the operation is performed in advance. The mode information is supplied to the second controlling circuit 4e. The selectors 4a and 4b perform a switching and connecting of a signaling channel in accordance with the control of the second controlling circuit 4e to be explained later.

The second controlling circuit 4e has a function of generating a predetermined receiving signal based on the serial signal supplied from the first controlling circuit 3h, and supplying the receiving signal to the interface device 7 via the interface cable 8 in a state where the mode of the radiotelephone unit 1 has been set to the automatic data reception mode. In the case where an off-hook signal or an on-hook signal is returned from the data terminal device 2, the off-hook signal or the on-hook signal is converted to a serial signal, and supplied to the radio device 3. Also, the switching control of the selectors 4a and 4b is performed based on the off-hook signal or the on-hook signal.

The data terminal interface device 7 comprises a ringer circuit 7a and a booster 7b. The ringer circuit 7a generates a ringer signal based on the receiving signal supplied from the first controlling circuit 3h, and supplies the ringer signal to the data terminal device 2 via the data terminal interface cable 6.

The data terminal device 2 comprises a ringer detector 2a, a hook switch 2b, and a hybrid circuit 2c. The ringer detector 2a switches the hook switch 2b to an off-hook state from an on-hook state based on the detection of the ringer signal incoming from the ringer circuit 7a, carries out the return of the off-hook signal, and sets the data terminal device 2 to a data receiving stand-by state.

The radio device 3 and the telephone device 4 are connected to each other by radio-telephone interface connectors 5a and 5b. The data terminal interface device 7 and the data terminal device 2 are connected to each other by data terminal interface connectors 6a and 6b. Moreover, the telephone device 4 and the data terminal interface device 7 are connected to each other by interface connectors 8a and 8b.

The operations of the above-structured radiotelephone unit 1, interface device 7, and data terminal device 2 will now be explained.

In the state that the normal communication mode is set, each of the selectors 4a and 4b is set to the L side. In this state, a radio communication signal incoming via a wire telephone network (not shown) and a radio station (not shown) is received at the receiving circuit 3c via the antenna 3a of the radio device 3 and the antenna shearing unit 3b. Then, the radio communication signal is synthesized with a local oscillation signal outputted from the frequency synthesizer 3d, and converted to an intermediate frequency signal. The intermediate frequency signal is FM-demodulated by the analog demodulating circuit 3f, and converted to a voice signal. Thereafter, the voice signal is supplied to the selector 4a. At this time, since the selector 4a is set to the L side, the voice signal is supplied to the receiver 4c, and voice-outputted from the receiver 4c.

On the other hand, a transmitting signal outputted from the transmitter 4d is supplied to the selector 4b. Since the selector 4d is set to the L side, the transmitting signal is supplied to the analog modulating circuit 3g. In the analog modulating circuit 3g, the intermediate frequency signal is FM-modulated by the transmitting signal, and converted to a high frequency signal by the transmitting circuit 3e, and transmitted from the antenna 3a.

The operation at the time of the automatic data receiving mode will be explained with reference to FIGS. 1 and 2.

It is assumed that the instruction signal designating the automatic data receiving mode is inputted to the second controlling circuit from the console unit 4g, and thereby the mobile telephone unit 1 is set to the automatic data receiving mode. Under this condition, it is also assumed that the data terminal device on the transmitting side connected to the wire telephone network calls to transfer data to the data terminal device 2. The calling signal is generated from the wire telephone network. The calling signal is radio-transferred to the radiotelephone unit 1 from the radio base station, and received by the receiving circuit 3c. The received calling signal is converted to a serial signal by the first controlling circuit 3h, and inputted to the second controlling circuit 4e of the telephone device 4. The serial calling signal inputted to the second controlling circuit 4e is outputted by Dout of the second controlling circuit 4e, and inputted to the ringer circuit 7a of the interface device 7. In the ringer circuit 7a, a ringer signal is generated based on the input of the calling signal, and the ringer signal is inputted to the data terminal device 2 via L2. The second controlling circuit 4e generates a tone ringer from a sounder (not shown) based on the supply of the serial signal.

In the ringer detector 2a of the data terminal device 2, the incoming ringer signal is detected and the hook switch 2b of the data terminal device 2 is switched from the on-hook state to the off-hook state and an off-hook signal is generated. Then, the off-hook signal is inputted to the Din of the second controlling circuit 4e via the interface device 7. At this time, in the interface device 7, the incoming off-hook signal is detected and the generation of the ringer signal is stopped, and each of the selectors 4a and 4b is set to the H side. Moreover, the off-hook signal is converted to the serial signal and supplied to the first controlling circuit 3h. In the first controlling circuit 3h, the incoming serial signal is detected and a predetermined response signal is generated, and the response signal is transmitted to the base station. The response signal received at the base station is sent to the wire telephone network. As a result, the data terminal device on the transmission side and the radiotelephone unit 1 on the receiving side are connected by the wire telephone network, and thereby the subscriber on the transmission side can transfer data.

In the above state, the data signal transferred from the data terminal device on the transmission side is radio-transferred to the radiotelephone unit 1 via the wire telephone network and the radio base station. Then, the data signal is received by the receiving circuit 3c via the antenna 3a, and passed through the analog demodulating circuit 3f, and supplied to the selector 4a. At this time, since the selector 4 is set to the H side, the data signal is supplied to the data terminal device 2 via the interface device 7, and data is received.

Thereafter, if the predetermined data transmission is ended in the data terminal device on the transmission side, and an end process is carried out, the end process is transmitted to the radio base station from the wire telephone network. Then, an end signal is transferred to the radiotelephone unit 1 from the radio base station, and inputted to the data terminal device 2 from the control circuit of the unit 1 via the interface device 7. In the data terminal device 2, if the incoming end signal is detected, the hook switch 2b is switched from the off-hook state to the on-hook state, and the on-hook signal is generated. The on-hook signal is detected by the interface device 7, and transferred to the second controlling circuit 4e of the radiotelephone unit 1. In the second controlling circuit 4e, if the incoming on-hook signal is detected, each of the selectors 4a and 4b is set to the L side, and the radiotelephone unit 1 is returned to the normal communication state, and the end control is carried out.

According to the above-explained embodiment, the interface device 7 is provided so as to connect the data terminal device between the radiotelephone unit 1 and the data terminal device 2. In the case where the calling signal is sent, the ringer circuit 7a of the interface device 7 generates a ringer signal and the ringer signal is transferred to the data terminal device 2, and the off-hook signal of the data terminal device 2 is sent to the radiotelephone unit 1 via the interface device 7. As a result, the data terminal device 2 can be automatically line-connected to the data terminal on the transmission side via the radiotelephone unit 1. Due to this, unlike the prior art, it is unnecessary to perform the mode setting operations of the radiotelephone unit 1 and the data terminal device 1 manually. As a result, even if the subscriber is not in the car or is driving the car, data can be automatically received from the data terminal on the transmission side.

Moreover, in the terminal connecting device 7, there is further added the booster 7b in which voltage Vcc sent from the battery 3i of the radio device 3 is introduced as an input voltage via the interface device 8, and the input voltage is boosted up to the predetermined voltage. The voltage outputted from the booster 7b is supplied to each part of the terminal connecting device, and the voltage generated via the interface device 7 is supplied to the data terminal device such as the facsimile machine 2 to be mounted on the car.

As mentioned above, in the terminal connecting device, there is provided a power supply unit such as the booster 7b using the the power supply output outputted from a radiotelephone unit. Therefore, it is unnecessary to independently provide a power source for driving the data terminal device such as the facsimile machine to be mounted on the car. Due to this, the necessary voltage can be easily ensured.

The present invention is not limited to the above embodiment. In the above embodiment, the booster 7b serving as a power supply unit for the the data terminal is provided in the the interface device 7. Then, the booster 7b boosts the output of the car battery 3i of the mobile radiotelephone unit 7 and supplies the output serving as a d.c. voltage to the data terminal device 2. However, in place of the booster 7b, a d.c. power source such as a battery may be provided in the terminal connecting device.

Figure 3:
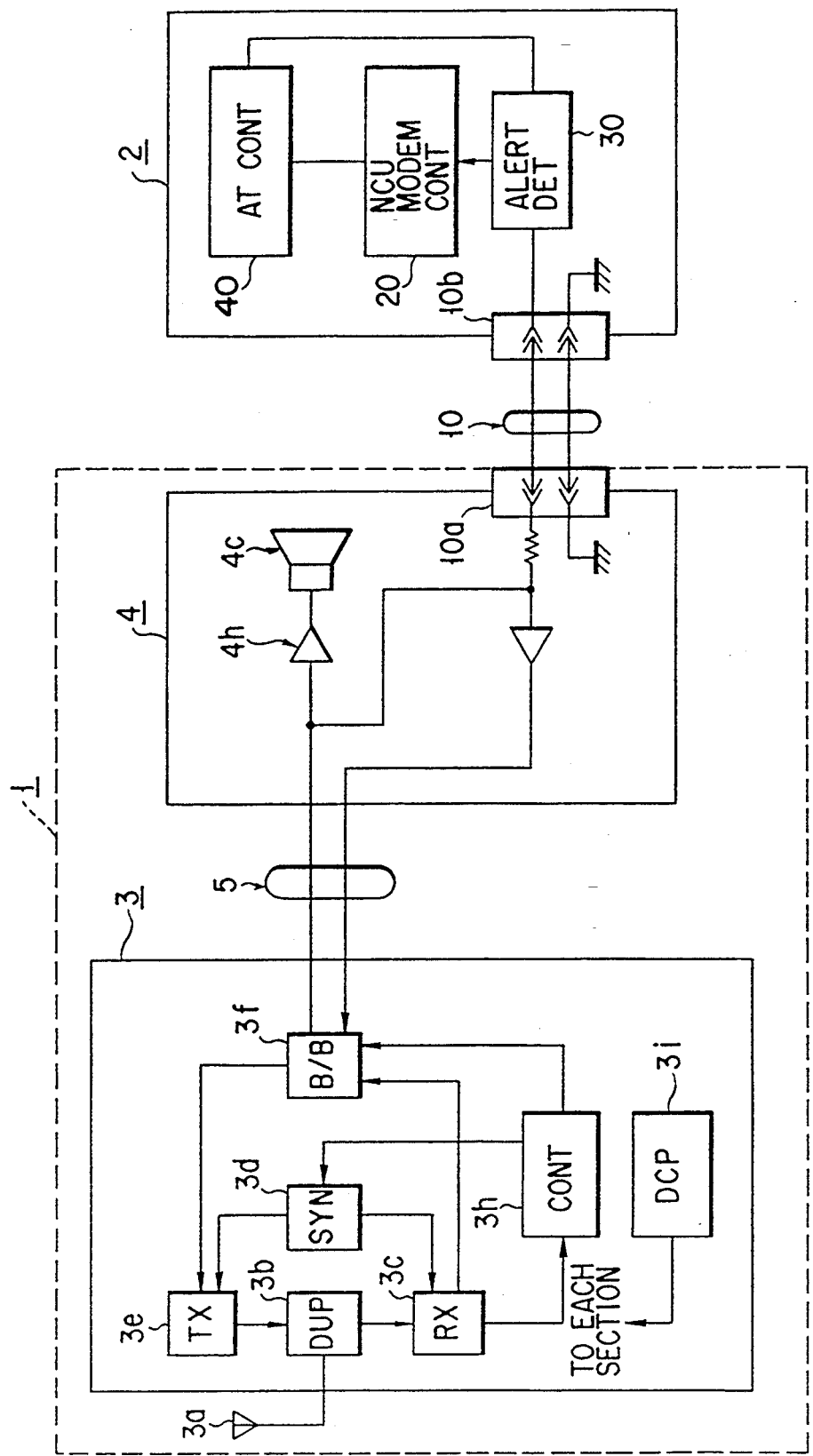
FIG. 3 is a circuit block diagram showing the structure of a mobile radiotelephone system using a terminal connecting device according to another embodiment of the present invention.

FIG. 3 is a circuit block diagram showing a second embodiment of the present invention. There is shown a system structure in which the facsimile machine 2, severing as a data terminal device, to be mounted on the car is connected to the radiotelephone unit 1 via an interface cable 10. As shown in the drawing, in the radiotelephone unit 1, the radio device 3 and the telephone device 4 are connected to each other by the interface cable 5. The facsimile machine 2 comprises an alert signal detector 30, a network modem controlling unit (NMU) 20, and an automatic receiving procedure controlling unit 40, which is operated by a software program, for generally controlling the detector 30 and the unit 20. As a result, an "automatic data receiving function", which is similar to the previous embodiment, can be obtained.

More specifically, the data terminal device having such an automatic data receiving function, e.g., facsimile machine 2, is connected to the communication network (not shown) via the radio line. Such a data terminal device comprises the alert signal detector 30 for detecting an alert signal meaning the reception of the calling signal, which is emitted from the opposite side (i.e. data receiving side) with which the radio device 3 having a transmitting and receiving control function communicates; the network modem controlling unit (NMU) 20, which is connected to the alert detector 30 and controls communication with the communication network; and the automatic receiving procedure controlling unit 40, which is operated by a software program, for recognizing that the alert detector 30 detects the alert signal, and controlling the detector 30, and starting the operation of the automatic procedure.

The radio device 3 comprises an antenna 3a, an antenna sharing unit (DPU) 3b, a receiver (RX) 3c for demodulating a received signal to a voice signal or a data signal, a synthesizer (SYN) 3d for selecting a transmitting and receiving frequency, a transmitter (TX) 3e for modulating the voice signal to be transmitted or the data signal, an audio unit (B/B) 3f for controlling the voice signal to be transmitted and received, a control unit (CONT) 3h for controlling each part, and a power supply unit (DPC) 3i for supplying power to each part of the the radio device 3.

The operation of the radiotelephone unit 1 and the data terminal device 2 will now be explained.

In the case where a facsimile transfer is carried out from the opposite telephone calling signal is received by the receiver 3c of the radio device 3. The calling signal is recognized by the controlling unit 3h. The calling signal is converted to the alert signal and outputted from the audio unit 3f, and sent to the telephone device 4 via the interface cable 5. Thereafter, the alert signal amplified by an amplifier 4h is outputted from a speaker 4c. At the same time, when the control unit 3h of the radio device 3 receives the calling signal, the control unit 3h starts a timer (not shown), which is set in advance by the software, and stops the generation of the alarm sound after passing a certain period of time. Moreover, the control corresponding to the key operation of the telephone device 4 of the radiotelephone unit 1 is automatically performed. Thereby, the radiotelephone unit 1 is automatically set to be in a facsimile transfer terminal mode.

In the above embodiment, it is assumed that the automatic setting function in the facsimile transfer terminal mode is provided in the telephone device 4 in advance. In this case, the facsimile transfer, which is not an ordinary telephone communication, must be provided.

Moreover, since the receiving signal line is connected to a terminal interface connector 10a of the telephone device 4, the alert signal is transmitted to the facsimile machine 2 via the interface cable 10. Therefore, the alert signal generated by the control unit 3h of the radio device 3 of the radiotelephone unit 1 passes through the interface cable 5, and is detected by the alert detector 30 of the facsimile machine 2 via the interface cable 10. The network modem control unit 20 of the facsimile machine 2 is controlled by the output of the alert detector 30, so that automatic reception the procedure of the facsimile is started. Subsequently, if a signal to be received by the opposite telephone is transmitted, and the opposite telephone confirms that the facsimile may be transmitted, data can be transferred to the facsimile machine 2.

As explained above, from the alert signal of the mobile radiotelephone unit, the calling signal is detected in the facsimile machine device 2. Thereafter, the automatic receiving of the facsimile is started, so that the plurality of the responses by the manual operation become unnecessary. Therefore, since the manual operation is unnecessary, there can be provided a facsimile terminal connecting device in which the data receiving can be safely and surely carried out even if the subscriber is not in the car or is driving the car.

Regarding the communication system to be applied or the type of the data terminal device, the present invention is not limited to the facsimile terminal device.

The present invention can be applied to the other data terminal devices.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A terminal connecting device for interfacing a radio telephone device to a data terminal device, wherein said radio telephone device comprises a switch for selecting, in response to a control signal, either a voice signal path or a data signal path to said data terminal device, said terminal connecting device comprising:

a first connector connectable to said radio telephone device for accepting signals from said radio telephone device and said radio telephone device;

a second connector connectable to said data terminal device for sending and receiving signals to and from said data terminal device;

first means, connected between said first connector and said second connector for receiving from said first connector a predetermined signal in response to detection of a calling signal, generating a ringer signal compatible with said data terminal device upon receiving said predetermined signal, and transferring the ringer signal to said second connector; and second means, connected between said first connector and said second connector, for receiving a receive response signal from said second connector indicating said data terminal device is in a data reception state, and for transferring the receive response signal to said first connector to generate said control signal to select the data signal path.

2. The terminal connecting device according to claim 1, wherein said second means comprises on-hook signal transfer means, connected between said first and second connectors, for transferring an on-hook signal generated by said data terminal device through said first connector to said radio telephone device.

3. The terminal connecting device according to claim 1, further comprising:

accepting means for accepting a voltage from said radio telephone device;

a voltage booster, connected to said accepting means, for boosting the accepted voltage to a higher voltage; and means for providing the higher voltage to said data terminal device to thereby power it.

4. The terminal connecting device according to claim 3, wherein said means for providing the higher voltage comprises a direct electrical connection between said voltage booster and said second connector.

5. The terminal connecting device according to claim 3, further comprising power providing means, coupled to said second connector, for accepting power from a battery and providing the power to said data terminal device.

6. A radio telephone device connectable to a data terminal device, comprising:

means for designating, from a radio unit, that an automatic data reception operation is to be performed;

means for detecting an incoming call signal to said radio unit;

means for converting the incoming call signal, in response to designation of the automatic data reception operation, into a ringer signal recognizable by said data terminal device;

means for transferring the ringer signal to said data terminal device;

means for detecting a first response signal generated by said data terminal device;

means for switching, in response to the detected first response signal, a radio voice input line and a radio voice output line from said radio unit to said data terminal device;

means for detecting a second response signal generated by said data terminal device; and means for switching, in response to the detected second response signal, the radio voice input line and the radio voice output line back to said radio unit.

7. The terminal connecting device according to claim 1, wherein said first means is a ringer circuit for generating a ringer signal.

8. The terminal connecting device according to claim 1, wherein said radio telephone device is a mobile radio telephone apparatus, said data terminal device has a facsimile function and is mounted in a car.

9. The terminal connecting device according to claim 1, wherein said radio telephone device comprises:

a radio unit for receiving signals from a communication network via a radio link and demodulating the signals thereafter, and for modulating and transmitting signals to the communication network via the radio link;

a console unit for designating an automatic data reception mode;

switch means, coupled to said first connector, response to a switch control signal to selectively transfer demodulated data from said radio unit to said first connector, and transfer output data from said first connector to said radio unit for modulation thereof; and control means, coupled to said first connector and to said console unit, for controlling said switch means in response to designation of said automatic data reception mode, and wherein said control means comprises:

response signal detection means for detecting a response signal from said first connector, call detecting means for detecting the calling signal received from said radio unit, and switch control means, coupled to said switch means, for generating the switch control signal in response to the response signal.

10. The terminal connecting device according to claim 9, wherein said switch means is coupled to said first connector through a hybrid circuit included in said radio telephone device.

11. The terminal connecting device according to claim 10, wherein said control means disables the ringer signal in response to the receive response signal.

* * * * *